Patented Dec. 25, 1945

2,391,822

UNITED STATES PATENT OFFICE 2,391,822

PROCESS FOR PRODUCING 2-AMINO-PYRIMIDINES

Michael N. Dvornikoff, St. Louis, Mo., assignor to Monsanto Chemical Company, St. Louis, Mo., a corporation of Delaware No Drawing. Application June 9, 1944, Serial No. 539,591

10 Claims. (Cl. 260—251)

This invention relates to an improvement in the production of 2-aminopyrimidines from halogenated 2-aminopyrimidines.

The compound 2-aminopyrimidine and its homologues, the alkyl substituted 2-aminopyrimidines, are employed in the production of pharmaceutical agents which are used successfully against various micro-organisms. The 2-aminopyrimidines are produced by reducing halogenated 2-aminopyrimidines by means of a zinc dust to replace a halogen atom with a hydrogen atom. An improved process as applied to 2-amino-4-chloropyrimidine is described in U. S. Pats. 2,254,186 and 2,242,079. The present invention is directed to further improvements on these processes. The processes as described in these patents result in a fair degree of reduction only when the halogenated 2-aminopyrimidine is purified, for example, by crystallization, before the reduction is attempted. The process as applied to crude halogenated 2-aminopyrimidines as produced commercially frequently fails to give complete dehalogenation of the halogenated 2-aminopyrimidine to the corresponding 2-aminopyrimidine.

According to the present invention generally stated, an improved method of dehalogenating halogenated 2-aminopyrimidines is effected by conducting the dehalogenation with zinc under alkaline conditions with the addition of a salt of a metal selected from the group consisting of tin or bismuth. In the presence of a salt of one of these metals, the dehalogenation of crude halogenated 2-aminopyrimidines proceeds smoothly, with resultant completion of the reaction and substantially quantitative yields of the corresponding 2-aminopyrimidines.

The chlorides and bromides of tin and of bismuth are the desired salts for the purpose of the present invention. Other salts of these metals may be employed such as the iodides, sulfides, hydroxides, acetates or oxalates. The quantity of tin salts or of bismuth salts required is not critical. In general, amounts of the order of 2% to 5% of the weight of the halogenated 2-aminopyrimidine may be employed, although larger amounts, for example, up to 10% or even 15% or more, may be used. These salts may be employed in the presence of a surface-active agent, if desired, such as ordinary charcoal, activated carbon, silica gel, diatomaceous earth, alumina gel and sodium aluminum silicate gel, although the dechlorination of crude halogenated 2-aminopyrimidines to the corresponding 2-aminopyrimidines is accomplished satisfactorily by the method of the present invention without the use of such surface-active agents.

Salts of numerous metals have been tried in the place of tin or bismuth salts, such as the salts of calcium, magnesium, iron, aluminum, chromium, titanium, manganese, cobalt, nickel, copper, lead, antimony, mercury and cerium. However, the salts of none of these other metals have been found to be of any assistance in facilitating the reduction.

The process of the present invention may be employed with purified halogenated 2-aminopyrimidines in place of the crude materials. By purified material is meant crude plant material which has been recrystallized, for example, from dilute alcohol or other solvent. However, the advantages of the present process are most outstanding with the crude materials.

The following examples will serve to illustrate specific embodiments of the process of the present invention. These examples are to be construed as merely illustrative and not as limiting the invention except as defined in the appended claims. For example, while the examples illustrate the process of the present invention, other alkaline materials may be used to fix the halogen which is removed from the halogenated aminopyrimidine during the reduction. Suitable agents for this purpose are sodium carbonate, ammonia and sodium hydroxide.

Example I

To a mixture of 6.4 parts of sodium bicarbonate in 55 parts of water containing 1 part of 28% ammonia and 7.8 parts of zinc dust was added 20 parts of a plant paste of crude 2-amino-4-chloropyrimidine (approximately 4.5 parts of the crude material) and 0.14 parts (3%) of stannous chloride. The mixture was agitated and refluxed for 4 hours. Thereupon the mixture was filtered and sodium hydroxide was added to the filtrate to salt out the product. The product was filtered off, washed with water, recrystallized from water and dried. Yield 2.7 parts. Melting point 159° C. The mother liquor and washes were combined and extracted with ether. An additional quantity of 0.7 parts of product was obtained. Total yield 3.4 parts or approximately theoretical yield. The product was 2-aminopyrimidine.

Example II

The process of Example I was repeated, using 0.23 parts (5%) of bismuth chloride in place of the stannous chloride. The product was 2-aminopyrimidine.

Example III

A mixture of 25 parts of sodium bicarbonate and 250 parts of water was heated to 60° C. To the mixture was added 3 parts of 28% ammonium hydroxide and thereafter 40 parts of zinc dust and 0.6 parts (2%) of stannous chloride. The temperature of the mixture was raised to 85° C., and 30 parts of crude 2-amino-4-methyl-6-chloropyrimidine was added slowly over a 20-minute period to the mixture while the mixture was agitated. Agitation was continued, and the temperature was maintained at 85° C. for approximately 4 hours. The hot mixture was then filtered, and the zinc and tin residues on the filter were washed with 100 parts of hot water. The filtrate and washings were combined and cooled. The product, 2-amino-4-methyl-pyrimidine, separated from the solution. The product was filtered off and dried. Yield 19 parts of 2-amino-4-methyl-pyrimidine. Melting point 158.5–159° C. The mother liquor and washings were combined and mixed with 120 parts of 50% sodium hydroxide solution to salt out residual 2-amino-4-methyl-pyrimidine. This residue of product was crystallized from 12 parts of water to give 3.1 parts of 2-amino-4-methyl-pyrimidine. Melting point 158.5–159° C. Total yield 22.1 parts of 2-amino-4-methyl-pyrimidine or approximately 97%.

Example IV

The process of Example III was repeated on 27 parts of crude 2-amino-4-chloropyrimidine, using 1.35 parts of stannous chloride (5% based on the chloropyrimidine). Complete reduction was effected within about 4 hours. The product was 2-amino-pyrimidine. Yield 98%.

Example V

The process of Example III was repeated on 26 parts of purified 2-amino-4-chloropyrimidine, using 0.5 parts of stannous chloride. The yield of 2-aminopyrimidine was substantially quantitative. The process was repeated without the stannous chloride. Dehalogenation required a much longer time in the latter instance.

Example VI

The process of Example III was repeated using 3.0 parts (10%) of bismuth subnitrate. The dehalogenation proceeded smoothly and the yield was substantially quantitative.

I claim:

1. A method of dehalogenating a chloro-2-aminopyrimidine to the corresponding 2-aminopyrimidine which comprises subjecting the chloro-2-aminopyrimidine to the action of metallic zinc under alkaline conditions in the presence of a salt of a metal selected from the group consisting of bismuth and tin.

2. A method of dehalogenating a chloro-2-aminopyrimidine to the corresponding 2-aminopyrimidine which comprises subjecting the chloro-2-aminopyrimidine to the action of metallic zinc under alkaline conditions in the presence of a chloride of a metal selected from the group consisting of bismuth and tin.

3. A method of dehalogenating a chloro-2-aminopyrimidine to the corresponding 2-aminopyrimidine which comprises subjecting the chloro-2-aminopyrimidine to the action of metallic zinc under alkaline conditions in the presence of from about 2% to about 15%, based on the chloro-2-aminopyrimidine, of a salt of a metal selected from the group consisting of bismuth and tin.

4. A method of dehalogenating a chloro-2-aminopyrimidine to the corresponding 2-aminopyrimidine which comprises subjecting the chloro-2-aminopyrimidine to the action of metallic zinc under alkaline conditions in the presence of from about 2% to about 5%, based on the chloro-2-aminopyrimidine, of a salt of a metal selected from the group consisting of bismuth and tin.

5. A process of preparing 2-aminopyrimidine from 2-amino-4-chloropyrimidine which comprises subjecting the latter to the action of metallic zinc under alkaline conditions in the presence of a salt of a metal selected from the group consisting of tin and bismuth.

6. A process of preparing 2-aminopyrimidine from 2-amino-4-chloropyrimidine which comprises subjecting the latter to the action of metallic zinc under alkaline conditions in the presence of a chloride of a metal selected from the group consisting of tin and bismuth.

7. A process of preparing 2-amino-4-methyl-pyrimidine from 2-amino-4-methyl-6-chloropyrimidine which comprises subjecting the latter to the action of metallic zinc under alkaline conditions in the presence of a salt of a metal selected from the group consisting of tin and bismuth.

8. A process of preparing 2-amino-4-methyl-pyrimidine from 2-amino-4-methyl-6-chloropyrimidine which comprises subjecting the latter to the action of metallic zinc under alkaline conditions in the presence of a chloride of a metal selected from the group consisting of tin and bismuth.

9. A process of preparing 2-aminopyrimidine from 2-amino-4-chloropyrimidine which comprises subjecting the latter to the action of metallic zinc under alkaline conditions in the presence of about 2% to about 10% of a chloride of a metal selected from the group consisting of tin and bismuth.

10. A process of preparing 2-amino-4-methyl-pyrimidine from 2-amino-4-methyl-6-chloropyrimidine which comprises subjecting the latter to the action of metallic zinc under alkaline conditions in the presence of about 2% to about 10% of a chloride of a metal selected from the group consisting of tin and bismuth.

MICHAEL N. DVORNIKOFF.